(12) United States Patent
Stone et al.

(10) Patent No.: US 10,780,371 B2
(45) Date of Patent: Sep. 22, 2020

(54) SYSTEM AND METHOD FOR EMULSION BREAKING AND PHASE SEPARATION BY DROPLET ADHESION

(71) Applicants: The Trustees of Princeton University, Princeton, NJ (US); TSINGHUA UNIVERSITY, Beijing (CN); UNIVERSITY OF SCIENC AND TECHNOLOGY BEIJING, Beijing (CN)

(72) Inventors: Howard A. Stone, Princeton, NJ (US); Jiang Li, Beijing (CN); Haosheng Chen, Beijing (CN)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 62 days.

(21) Appl. No.: 16/178,669

(22) Filed: Nov. 2, 2018

(65) Prior Publication Data
US 2019/0134535 A1    May 9, 2019

Related U.S. Application Data

(62) Division of application No. 14/829,259, filed on Aug. 18, 2015, now Pat. No. 10,150,058.
(Continued)

(51) Int. Cl.
*B01D 17/022*    (2006.01)
*B01D 17/04*    (2006.01)
(Continued)

(52) U.S. Cl.
CPC ............ *B01D 17/04* (2013.01); *B01F 5/0647* (2013.01); *B01F 13/0071* (2013.01);
(Continued)

(58) Field of Classification Search
CPC .... B01D 17/04; B01F 13/0071; B01F 5/0647; B01J 2219/00792; B01J 2219/00831; B01J 2219/0084; B01J 2219/00903
See application file for complete search history.

(56) References Cited

U.S. PATENT DOCUMENTS 9,180,453 B2 * 11/2015 Chiu ................. B01L 3/502784
10,150,058 B2 * 12/2018 Stone .................... B01D 17/04
(Continued)

OTHER PUBLICATIONS

Gaakeer, W. A. et al., "Liquid-liquid slug flow separation in a slit shaped micro device", Chemical Engineering Journal, 2012, pp. 1-5.
(Continued)

*Primary Examiner* — Michael A Salvitti
(74) *Attorney, Agent, or Firm* — Meagher Emanuel Laks Goldberg & Liao, LLP

(57) ABSTRACT

Emulsion breaking and phase separation is achieved by droplet adhesion. An emulsion breaking device includes a channel having distinct adjacent zones with distinctly different surface wettability characteristics, namely, solvophilic and solvophobic surfaces. The device is positioned such that the upstream portion of the device is configured to be wetted by the continuous phase of the emulsion, and the downstream portion of the device is configured to be wetted by the dispersed phase of the emulsion. As the emulsion flows from the upstream zone to the downstream zone, the change in surface wettability characteristics promotes adhesion of the dispersed phase as the dispersed phase wets the surface of the downstream portion of the channel, which results in breaking of the emulsion. Subsequent collection of the broken emulsion in a collection vessel results in separation of the disparate phases to facilitate their recapture and recycling.

6 Claims, 8 Drawing Sheets

Related U.S. Application Data

(60) Provisional application No. 62/038,435, filed on Aug. 18, 2014.

(51) Int. Cl.
    *B01L 3/00*     (2006.01)
    *C03C 17/00*     (2006.01)
    *C03C 17/30*     (2006.01)
    *B01J 19/00*     (2006.01)
    *B01F 5/06*     (2006.01)
    *B01F 13/00*     (2006.01)

(52) U.S. Cl.
CPC ..... *B01J 19/0093* (2013.01); *B01L 3/502707* (2013.01); *B01L 3/502769* (2013.01); *C03C 17/004* (2013.01); *C03C 17/30* (2013.01); *B01J 2219/0084* (2013.01); *B01J 2219/0086* (2013.01); *B01J 2219/00783* (2013.01); *B01J 2219/00792* (2013.01); *B01J 2219/00828* (2013.01); *B01J 2219/00831* (2013.01); *B01J 2219/00833* (2013.01); *B01J 2219/00889* (2013.01); *B01J 2219/00903* (2013.01); *B01J 2219/00907* (2013.01); *B01L 2200/0673* (2013.01); *B01L 2300/0838* (2013.01); *B01L 2300/0864* (2013.01); *B01L 2300/161* (2013.01); *B01L 2400/0487* (2013.01); *C03C 2217/76* (2013.01)

(56) References Cited

U.S. PATENT DOCUMENTS

| | | | |
|---|---|---|---|
| 10,384,961 B2* | 8/2019 | Solomon | C02F 1/44 |
| 2010/0041046 A1* | 2/2010 | Chiu | G01N 35/10 |
| | | | 435/287.2 |
| 2010/0208328 A1* | 8/2010 | Heikenfeld | G02B 26/005 |
| | | | 359/290 |
| 2013/0240447 A1* | 9/2013 | Solomon | B01D 69/02 |
| | | | 210/651 |
| 2015/0075989 A1* | 3/2015 | Solomon | C02F 1/444 |
| | | | 204/514 |
| 2016/0045843 A1* | 2/2016 | Stone | B01F 13/0071 |
| | | | 516/135 |
| 2016/0096172 A1* | 4/2016 | Chiu | B01L 3/502 |
| | | | 435/309.1 |
| 2016/0146823 A1* | 5/2016 | Chiu | G01N 33/5304 |
| | | | 506/9 |
| 2019/0134535 A1* | 5/2019 | Stone | B01L 3/502769 |

OTHER PUBLICATIONS

Kralj, Jason G. et al., "Integrated continuous microfluidic liquid-liquid extraction", Lab Chip, 2007, pp. 256-263, vol. 7, Royal Society of Chemistry.

Phillips, Thomas W. et al., "Microscale extraction and phase separation using a porous capillary", Lab Chip, 2015, pp. 2960-2967, vol. 15, Royal Society of Chemistry.

Bremond et al., "Decompressing emulsion droplets favors coalescence," Physical review letters, 2008, vol. 100, No. 2, pp. 024501.

Chen et al. "The chemistrode: a droplet-based microfluidic device for stimulation and recording with high temporal, spatial, and chemical resolution," Proceedings of the National Academy of Sciences, 2008, vol. 105, No. 44, pp. 16843-16848.

Kralj et al., "Surfactant-enhanced liquid-liquid extraction in microfluidic channels with inline electric-field enhanced coalescence," Lab on a Chip, 2005, vol. 5, No. 5, pp. 531-535.

Priest et al., "Controlled electrocoalescence in microfluidics: Targeting a single lamella", Applied Physics Letters, 2006, vol. 89, No. 13, pp. 134101.

Tan et al., "Droplet coalescence by geometrically mediated flow in microfluidic channels", Microfluidics and Nanofluidics, 2007, vol. 3, No. 4, pp. 495-499.

Thiam et al., "Breaking of an Emulsion under an AC Electric Field", Physical review letters, 2009, vol. 102, No. 18, pp. 188304-1 to 188304-4.

* cited by examiner

SYSTEM AND METHOD FOR EMULSION BREAKING AND PHASE SEPARATION BY DROPLET ADHESION

CROSS-REFERENCE FOR RELATED APPLICATION

This application is a divisional application of U.S. patent application Ser. No. 14/829,259, filed Aug. 18, 2015, and entitled "System and Method for Emulsion Breaking and Phase Separation by Droplet Adhesion." This application further claims the benefit of priority under 35 U.S.C. § 119(e) to U.S. Provisional Patent application No. 62/038,435, filed Aug. 18, 2014. Each of the above-identified applications are hereby incorporated by reference in their entireties as if fully set forth below.

FIELD OF THE INVENTION

The present invention relates generally to the field of fluidics, and more particularly to a system and method for breaking stable emulsions, commonly used in microfluidic applications, and for separating the fluids in the emulsion.

BACKGROUND

Though relevant in other applications, stable oil-in-water and stable water-in-oil emulsions are commonly used in microfluidics applications. In typical microfluidic systems, droplets (e.g., oil or water) are entrained in a continuous phase (e.g., water or oil, respectively), and the emulsion is transported in microchannels of the microfluidic system.

The adhesion of droplets to substrates is a common phenomenon in nature. In a microfluidic system, adhesion could occur when droplets, etc. are transported in microchannels. This is generally undesirable for microfluidics applications, as it is disruptive to essential droplet structure and/or droplet flow. Accordingly, in most circumstances, the inner surface of the microchannels is, or is modified to be, wetting for the continuous phase in order to prevent adhesion of suspended objects either in the flow-focusing or "T" junction geometries used for generation of emulsion droplets, or in a lab-on-a-chip device for cell assays.

In certain circumstances, it is desirable to break the emulsions, and/or to separate the phases of the emulsion. For example, emulsion droplets are used in many lab-on-a-chip applications, such as for encapsulation, delivery, and separation. Typically, the emulsions are stable and not easily broken down to two separated phases. However, in some applications, the materials of the emulsions are valuable and so recycling is needed or would be desirable.

One conventional microfluidic technology for breaking an emulsion is electric-field enhanced coalescence. This technology is used to break water-in-oil emulsions by electro-coalescence of the water droplets to form larger droplets for further separation. The microfluidic devices are typically fabricated by lithography and etching on a silicon wafer, micromachining on poly(methylmethacrylate) (PMMA) or soft lithography of poly(dimethylsiloxane) (PDMS). For electric-field enhanced coalescence, electrodes should also be fabricated on the devices. This adds undesirable complexity to the fabrication of the device, and further requires an external electric field for operation.

Another conventional emulsion-breaking technology is passive-controlled coalescence. This technology is used to break water-in-oil emulsions by the controlled coalescence of the water droplets due to the geometrical design of the channels. Consistent with this approach, the microfluidic devices are fabricated, for example, by soft lithography of PDMS, to realize the required design geometries. Thus, this approach requires modification of the microfluidics device structure, and adds complexity to both the geometries and the fabrication processes.

Yet another conventional emulsion-breaking technology involves use of a phase separator with an embedded porous membrane. This technology is based upon capillary forces and selective wetting of surfaces. In an exemplary embodiment, a PTFE membrane, which is hydrophobic and porous, is placed between two micromachined channels, the top portion and the bottom portion. When the water-in-oil emulsion flows into the top portion of the channel, the aqueous phase, which does not wet the PTFE membrane, passes across the membrane surface to the outlet of the top portion of the channel, while the organic oil phase wets and flows through the pores of the membrane to the outlet of the bottom portion of the channel. Besides the design and fabrication of the microchannel, a custom microfluidic chuck also needs to be designed and fabricated to support the membrane and to provide connections and seals of the device. Again, the approach requires modification of the microfluidics device structure, and adds complexity to both the geometries and the fabrication processes.

What is needed is an emulsion breaking and phase separation approach that does not add undue complexity to the microfluidic device structure, and that does not require an external electric field.

SUMMARY

The present invention provides an emulsion breaking and phase separation system that is accomplished by droplet adhesion, without undue complexity to a microfluidic device structure, and without a need for an external electric field. An emulsion-breaking device for breaking emulsions includes a body defining an elongated internal channel having an inner surface. A first zone of the channel has a solvophilic inner surface. A second zone of the channel has a solvophobic inner surface. The second zone and the first zone meet at a boundary intermediate a length of the channel. The device may include a solvophobic coating of octadecyltrichlorosilane (OTS).

The present invention further provides a method for making an emulsion-breaking device for breaking emulsions. The method comprises: providing a body defining an elongated internal channel having an inner surface, said body being constructed of a material that is one of a solvophilic and a solvophobic; positioning the body in a substantially vertical orientation; immersing less than an entire portion of the elongated internal channel in a bath of solution having a substantially horizontal surface while the body is maintained in the substantially vertical orientation, the solution contacting a corresponding portion of the internal channel; and causing the body to dwell in the solution for a time sufficient to create on the corresponding portion a coating that is the other of solvophilbic and solvophobic, the elongated internal channel being provided with a first zone having a solvophilic inner surface, and a second zone having a solvophobic inner surface, the second zone and the first zone meeting at a boundary intermediate a length of the channel.

The present invention further provides a method of breaking an emulsion. The method comprises: flowing an emulsion of droplets of a dispersed phase entrained in a continuous phase below a critical speed into one end of an emulsion breaking device comprising a body defining an elongated internal channel having an inner surface, a first zone of said channel having an inner surface that is solvophilic to the continuous phase, a second zone of said channel having an inner surface that is solvophobic to the continuous phase, the solvophilic and solvophobic inner surfaces meeting at a boundary intermediate a length of the channel; and collecting liquid flowing from the emulsion breaking device.

The present invention further provides a microfluidic system comprising the emulsion breaking device. More specifically, the microfluidic system comprises a microfluidic chip defining microchannels for passing a flow of an emulsion comprising droplets of a dispersed phase entrained in a continuous phase; an emulsion flow system providing the flow an emulsion through said microchannels of said microfluidic chip; and an emulsion breaking device for breaking emulsions, said emulsion breaking device comprising a body defining an elongated internal channel having an inner surface, a first zone of said channel having a solvophilic inner surface, a second zone of said channel having a solvophobic inner surface, the emulsion breaking device being positioned in fluid communication with said microfluidic chip to receive the flow of emulsion, the emulsion breaking device being oriented such that an upstream zone of said first and second zones is wetted by said continuous phase, and a downstream zone of said first and second zones is wetted by said dispersed phase.

The microfluidic system may include a phase separation system. The phase separation system comprises: a fluid collection vessel; and a body having a microchannel, said body being positioned to transport a flow of broken emulsion fluid from said emulsion breaking device to said fluid collection vessel.

The emulsion-breaking device may be used to break oil-in-water and water-in-oil emulsions.

BRIEF DESCRIPTION OF THE FIGURES

An understanding of the following description will be facilitated by reference to the attached drawings, in which.

DETAILED DESCRIPTION

The present invention provides a system and method for emulsion breaking and phase separation by droplet adhesion. More particularly, the present invention provides an emulsion-breaking and phase separation system that includes an emulsion-breaking device. The device includes a channel having distinct adjacent zones with distinctly different surface wettability characteristics.

In a first (upstream) zone of the channel, the channel's surface is configured to be wetted by the continuous phase of the emulsion. In a second (downstream) zone of the channel, the channel's surface is configured to be wetted by the dispersed phase of the emulsion. For example, for an oil-in-water emulsion, the upstream zone is provided with a hydrophilic surface, and the downstream zone is provided with a hydrophobic surface. By way of further example, for a water-in-oil emulsion, the upstream zone is provided with a hydrophobic surface, and the downstream zone is provided with a hydrophilic surface.

As the emulsion flows from the upstream zone to the downstream zone, the change in surface wettability characteristics promotes (below a critical speed) adhesion of the dispersed phase, as the dispersed phase wets the surface of the downstream portion of the channel, which results in breaking of the emulsion. Subsequent collection of the broken emulsion in a collection vessel results in separation of the continuous and dispersed phases, due to the differences in their material properties. The emulsion-breaking device is well-suited for use in microfluidic systems, and is particularly well-suited for recapture and recycling of the dispersed and/or continuous phase materials.

The present invention is discussed below with reference to FIGS. 1A-6D for illustrative, and non-limiting, purposes in the context of microfluidic systems.

Figure 1A:
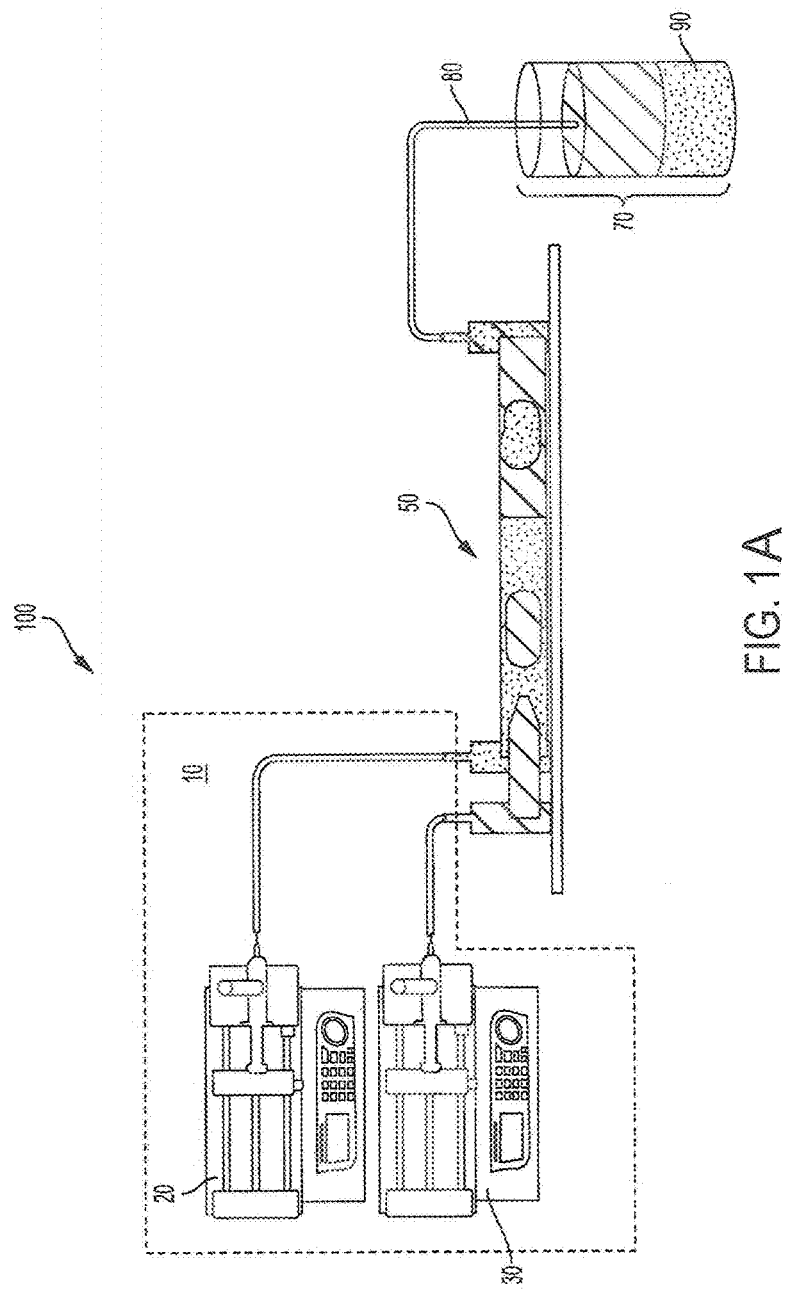
FIG. 1A is a schematic of an exemplary microfluidic system including an emulsion-breaking and phase separation system in accordance with an exemplary embodiment of the present invention, and adapted for an oil-in-water emulsion.

Referring now to FIG. 1A, an exemplary microfluidic system 100 is shown in schematic form. This exemplary microfluidic system 100 includes a conventional emulsion flow system 10. The exemplary emulsion flow system includes an oil-pumping system 20 and a water pumping system 30, both of which may be substantially conventional in structure, e.g., syringe pumps. Accordingly, as is conventional in microfluidic systems, the emulsion flow system 10 includes a conventional co-flowing structure 30 including a cylindrical glass capillary 32 having a tapered outlet 34 positioned within a channel 38 of a square glass capillary 36, as will be best appreciated from FIG. 1B.

In this example, the emulsion flow system 10 is configured to provide an oil-in-water emulsion. Accordingly, the oil supply and pump of the oil-pumping system 20 supplies a flow of oil via the tapered cylindrical glass capillary 32 for forming a dispersed phase of oil droplets, and the water supply and pump of the water-pumping system 30 supplies a flow of water via the square glass capillary 36 to form a continuous phase of water in which the oil droplets are entrained. As is known in the art, the flow rates of the pumps can be controlled to provide a stable flow of the oil-in-water emulsion via the emulsion flow system 10.

In accordance with the present invention, the microfluidic system 100 further includes an emulsion-breaking device 50 in accordance with the present invention. The emulsion-breaking device is preferably disposed within the system downstream of droplet/emulsion formation, and downstream of all processing steps for the droplets. The emulsion-breaking device 50 includes a body 52 defining a microchannel 54 for receiving a flow of emulsion. In this exemplary embodiment, the body is a square glass capillary defining a microchannel having a substantially square cross-sectional area of about $0.05 \times 0.05$ mm$^2$ to about $1.75 \times 1.75$ mm$^2$.

In alternative embodiments, the body 52 may be a glass capillary defining a microchannel having a circular or other cross-section. In other alternative embodiments, the microchannel may be a PDMS, PMMA, glass, or silicon body, and may have chevron-shaped, or any other regularly- or irregularly-shaped cross-section. Consistent with microfluidics applications, the microchannel should have a cross-sectional area in the range of about $0.01 \times 0.01$ mm$^2$ to about $2 \times 2$ mm$^2$. In a preferred embodiment, the body is constructed of a material that is impermeable by the dispersed phase.

The sizes of the droplets of the disclosed droplet adhesion technology are comparable to or larger than the dimension of microchannel, so that when an emulsion with small droplet size is treated, a microchannel with smaller dimension should be utilized.

In accordance with the present invention, the microchannel 54 of the body 52 of the emulsion-breaking device 50 is configured to have distinct zones adjacent one another, in a direction of fluid flow within the microchannel, within which the microchannel's interior surface 56 has distinctly different surface wettability characteristics.

In a first (upstream) zone 56a of the microchannel 54, the microchannel's interior surface is configured to be wetted by the continuous phase of the emulsion to be broken by the emulsion-breaking device 50. In a second (downstream) zone 56b of the microchannel 54, the microchannel's interior surface is configured to be wetted by the dispersed phase of the emulsion.

Figure 1C:
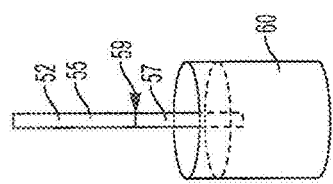
FIG. 1C is a diagrammatic view illustrating a process for making the emulsion-breaking device of FIG. 1B.
Figure 1B:
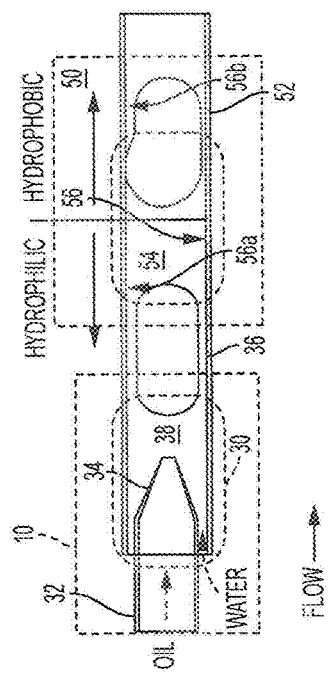
FIG. 1B is a diagrammatic view of an emulsion-breaking device of the emulsion-breaking device of FIG. 1A, adapted for an oil-in-water emulsion.

FIG. 1B is a diagrammatic view of an exemplary emulsion-breaking device 50 of the emulsion-breaking and phase separation system of FIG. 1A, adapted for use to break an oil-in-water emulsion. Accordingly, in the example of FIG. 1B, the upstream zone 56a is provided with a hydrophilic surface, and the downstream zone 56b is provided with a hydrophobic surface.

FIG. 1C is a diagrammatic view illustrating an exemplary approach for making the emulsion-breaking device 50 of FIG. 1B. In this exemplary approach, the body 52, in this example a glass capillary having a hydrophilic surface, of the emulsion breaking device 50 is provided with adjacent hydrophilic and hydrophobic zones by immersing a portion of the body 52 substantially vertically into a bath of octa-decyltrichlorosilane (OTS) solution held in an open container 60. This causes the solution to flow into the microchannel 54 of the body 52, and to coat, and thereby treat, the immersed portion of the inner surface of the body 52. By way of example, immersing the portion in the bath and causing it to dwell in a constant position for 10 seconds is suitable for treating the immersed portion.

The OTS coating causes the treated portion to be hydrophobic. Such immersion creates a boundary line 59 corresponding to the location of the surface of the OTS solution within the microchannel 54 as a result of the immersion. It will be noted that in this Figure, the body 52 is shown in a state of partial immersion. The boundary line marks a point of separation between adjacent zones of the microchannel 54, namely, a hydrophilic zone 55 (in this case the untreated portion of the microchannel having a hydrophilic surface), and a hydrophobic zone 57 (in this case, the immersed portion of the microchannel having a hydrophobic surface as a result of treatment by the OTS solution). The boundary line effectively separates the body into an upstream zone (having a substantially consistent surface wettability characteristic) from a downstream zone (having a substantially consistent surface wettability characteristic that is different from that of the upstream zone), and thus provides separate sequential zones arranged longitudinally relative to a direction of flow/direction of the flow channel within the device.

In this example, the body 52 was then rinsed with water from the untreated end, and the mean squared value of the surface roughness of the OTS-coated portion of the capillary was $15 \pm 2.5$ nm, as measured by an atomic force microscope (CSPM-4000). The contact angles of the hydrophilic section and the hydrophobic section were 11° and 90°, respectively. In one example, the body 52 was about 27 mm in length and the hydrophilic section was 16 mm long and the hydrophobic part was 11 mm long.

Any suitable structure may be used to provide the channel having the distinct zones with different surface wettability characteristics. Further, any suitable materials and methods may be used to provide an emulsion-breaking device having distinct zones adjacent one another, in a direction of fluid flow within the microchannel, within which the microchannel's interior surface has distinctly different, namely solvophilic and solvophobic, surface wettability characteristics. As used herein, the term solvophobic means lacking an affinity (in the nature of an attractive force between atoms, or groups of atoms) that contributes toward forming of chemical bonds or other attractive interactions between a specific solvent and a substrate; unable to be wetted by the specific solvent. Further, as used herein, the term solvophilic means having an affinity between a specific solvent and substrate; able to be wetted by the specific solvent. As used herein, hydrophobic and hydrophilic are examples of solvophobic and solvophilic, respectively.

Accordingly, the present invention is not limited to hydrophobic/hydrophilic surfaces, and to oil-in-water and water-in-oil emulsions. Further, any surface treatment or combination of surface treatments may be used to provide the adjacent zones having solvophilic and solvophobic surface wettability characteristics. For example, a naturally solvophilic material may be used to provide the solvophilic zone, and a surface treatment may be applied to provide the adjacent solvophobic zone, as discussed in the example above. Alternatively, a naturally solvophobic material may be used to provide the solvophobic zone, and a surface treatment may be applied to provide the adjacent solvophilic zone. Alternatively, either a solvophilic or solvophobic material may be used, and multiple treatments may be used to provide solvophilic and solvophobic zones.

In the embodiment of FIG. 1B, for breaking an oil-in-water emulsion, the body 52 treated as described above in relation to FIG. 1C, is positioned as the emulsion-breaking device 50 by disposing the device 50 within the microfluidic system 100 such that the hydrophilic zone 55 is positioned as the upstream zone 56a, and the hydrophobic zone 57 is positioned as the downstream zone 56b (the emulsion flowing from left to right in FIG. 1B).

Figure 2A:
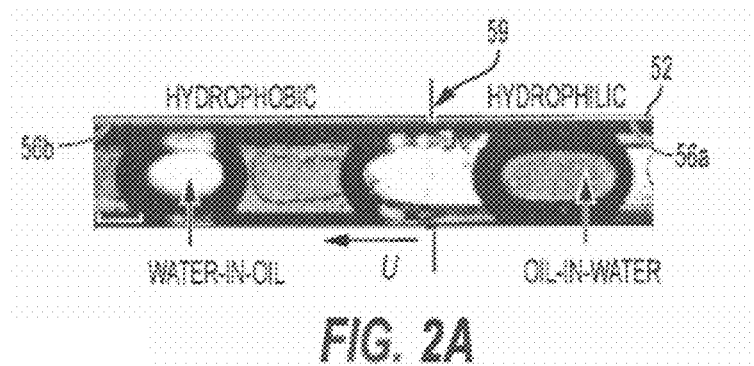
FIG. 2A is photographic image showing emulsion flow within the emulsion-breaking device of FIG. 1B.
Figures 2B, 2C:
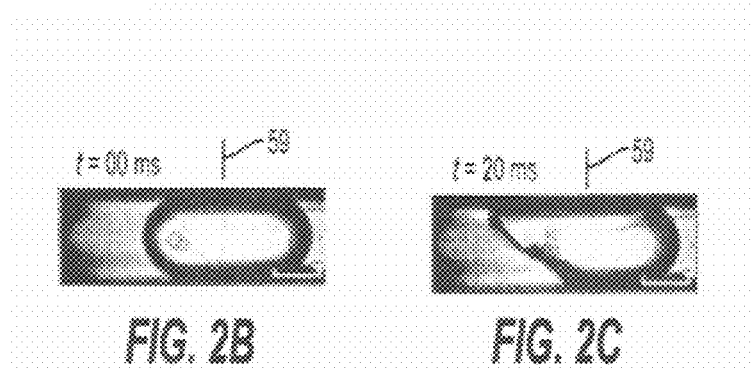
FIGS. 2B-2E are a series of time-sequenced photographic images showing an exemplary adhesion process for an exemplary oil-in-water emulsion within the emulsion-breaking device of FIG. 1B.
Figures 2D, 2E:
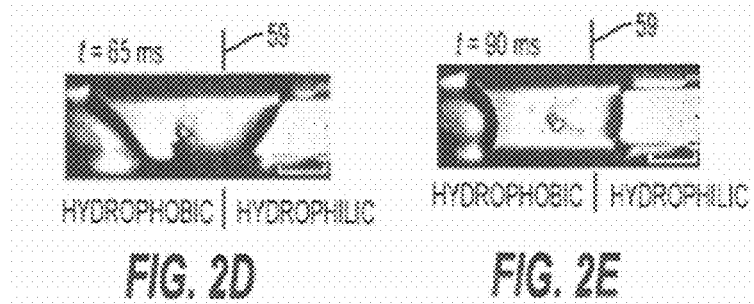

FIG. 2A is photographic image showing emulsion flow within the emulsion-breaking device 50 of FIG. 1B. As will be noted from FIG. 2A, the direction of emulsion flow within the body 52 in FIG. 2A is from the upstream zone 56a having a hydrophilic microchannel surface on the right to the downstream zone 56b having a hydrophobic microchannel surface on the left.

FIGS. 2B-2E are a series of time-sequenced photographic images showing an exemplary adhesion process for an exemplary oil-in-water emulsion adjacent the boundary 59 between the hydrophilic and hydrophobic zones within the emulsion-breaking device of FIG. 1B. As will be noted from FIGS. 2A and 2B-2E, adhesion of the droplets on the hydrophobic surface occurs as the oil-in-water emulsion droplets flow past the hydrophobic part of the microchannel. More specifically, the oil droplets adhere on the hydrophobic surface, wetting the hydrophobic microchannel surface, and hence the oil-in-water emulsion is broken.

In one example, the continuous phase is an aqueous solution of 2 wt. % polyvinyl alcohol (PVA, Mw=13000-23000 g/mol, 87-89% hydrolyzed, Sigma-Aldrich) and is injected between the two capillaries of the co-flowing device, and the oil phase is liquid paraffin (Sinopharm Chemical Reagent Beijing Co.), and is injected into the inner capillary of the co-flowing device. Both the injection of the aqueous phase and the oil phase are controlled by syringe pumps, and the size of the water droplets may be changed by adjusting the flow rate ratio of the two phases. In one example, the surface tension between the two phases was γ=16.6 mN/m, the viscosity of the aqueous phase was μ=1.9 mPa-s, and the viscosity of the oil phase was 28.9 mPa-s. In this example, the translation speeds of the droplets were 2.43 mm/s in FIG. 2A and 2.62 mm/s in FIGS. 2B-2E.

It has been found that adhesion of oil droplets to the hydrophobic surface depends upon the speed and size of the droplets. For example, for a given drop size, faster droplets can pass through the hydrophobic section without adhesion, while those moving more slowly will adhere. Accordingly, the speed of droplet flow within the microchannel may be controlled to ensure wettability of the downstream surface of the microchannel. Generally, it was found that slowing the flow velocity promoted adhesion.

Figure 3B:
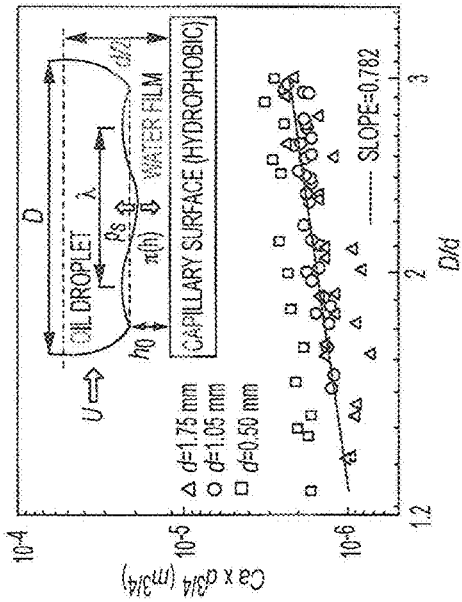
FIG. 3B is a graph illustrating a relationship between droplet speed and the ratio of the droplet length to the capillary diameter.
Figure 3A:
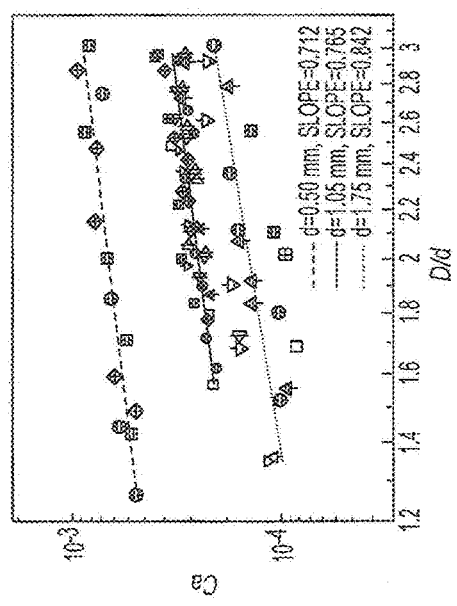
FIG. 3A is a phase diagram illustrating the influences of drop size and flow speed on adhesion for an exemplary oil-in-water emulsion.

An influence of drop size and flow speed on adhesion is shown in the phase diagram of FIG. 3A, where the axes are the dimensionless capillary number Ca=μU/γ and the dimensionless ratio of the length of the droplet D to the inner dimension d of a capillary channel, D/d. When plotted with logarithmic axes, experimental results of the critical capillary number fall roughly onto straight lines where each line corresponds to a different size square capillary, as shown in FIG. 3A.

Accordingly, for droplets with the same size, adhesion can be induced by lowering the [0054] translation speed, and for droplets moving with a constant speed, adhesion can be generated by increasing the droplet size.

Additionally, it has been found that the critical capillary number decreases as the capillary size increases, which indicates that droplet adhesion induced by the change of the capillary surface wettability happens more easily in smaller capillaries at relatively higher translation speeds of the droplets.

Adhesion will occur when the oil-water interface enters the interaction range of the attractive van der Waals force. However, the interface still needs to overcome a thin lubrication film formed between the moving oil droplet and the microchannel wall. Therefore, for adhesion, the lubrication film needs to be thin enough that the van der Waals force is equal to or larger than the Laplace pressure on the droplet interface in order to pull it onto the wall, as shown in FIG. 3B. FIG. 3B is a graph illustrating a relationship between one measure of the droplet speed on the vertical axis and the ratio of the droplet length to the capillary diameter on the horizontal axis. The capillary number is the product of the external phase viscosity and the fluid speed divided by the surface tension. As will be appreciated from FIG. 3B, the data indicates the speed above which the droplets do not adhere to the capillary walls. For a given D/d, for speeds below the line the droplets adhere to the wall (and the emulsion breaks).

In these experiments, the thickness of the lubrication film $h_0$ is related to the capillary number according to $h_0/d \sim Ca^{2/3}$, and so higher speeds correspond to thicker more stable films. It should be noted that this relationship applies for capillaries/channels of various cross-sections, e.g., both rectangular and circular cross-sections.

In the example of FIG. 1B, when the droplet is moves in the upstream hydrophilic zone 56a of the body 52, the thickness of the lubrication film is much larger than the interaction range of the van der Waals force, and so no adhesion occurs. But when the droplet moves into the downstream hydrophobic zone 56b of the body, the additional long-range hydrophobic force acts on the oil-water interface. This altered force causes instability of the interface, and makes the oil-water interface much closer to the capillary surface, and the van der Waals force on the on-water interface increases. When the van der Waals force equals the Laplace pressure, adhesion starts. The strength of the van der Waals force is given by the film thickness (h) dependent disjoining pressure $\sqcap n(h) = A(6\pi h^3)$, where A is the Hamaker constant. Since A lies in the range $(0.4-4) \times 10^{-19}$ J for most condensed phases, typical value of $A=1 \times 10^{-19}$ J is used in the calculations below. The corresponding Laplace pressure at a curved nearly cylindrical interface is $p_s = \gamma/r_c$, where $r_c$ is the radius of the curvature, which for a sinusoidally varying interface of wavelength λ and amplitude α is approximately $r_c \sim \lambda^2/a$. For adhesion to occur, the wave amplitude α is approximately $h_0$, and we expect λ approximately D, the size of the droplet. Therefore, according to the force balance equation $\sqcap (h) = p_s$, we obtain $(A/\lambda) D^2 \sim h_0^4$.

Combining the Bretherton equation had $h0/d \sim Ca^{2/3}$ and $(A\lambda)D2 \sim h04$, there is a relation between the critical capillary number for adhesion and the droplet size in the form $$Ca = k\left(\frac{A}{\gamma d^2}\right)^{\frac{3}{8}} \left(\frac{D}{d}\right)^{\frac{3}{4}}$$

where k is a constant. FIG. 3B plots the relationship between Ca×d$^{3/4}$ and D/d for the three different size capillaries. The normalized experiment results collapse and are almost in superposition, and the slope of Ca×d$^{3/4}$ versus D/d in the log-log plot is close to a theoretical predicted value of ¾. Therefore, this order-of-magnitude model rationalizes the experimental results as U, d, and D are varied. Moreover, the constant k=2.5 is obtained by the fitted line of the exemplary experimental results in FIG. 3B.

Accordingly, during flow in microfluidic devices, emulsion droplets are isolated from the channel wall by a thin lubricating film of the continuous phase and higher droplet speeds correspond to thicker films. The change of surface wettability in the emulsion breaking device is believed to cause the instability of this lubricating film below a critical drop speed, where the film thickness is smaller, and subsequently, there is adhesion of emulsion droplets to the walls of the channel. For a drop of size D (greater than the capillary dimension d), the critical capillary number for droplet adhesion has been found to be approximately $Ca \sim D^{3/4}/d^{3/2}$, which is believed to result from the lubrication film becoming thin enough for the van der Waals force to balance the Laplace pressure of the perturbed droplet interface.

Figure 4A:
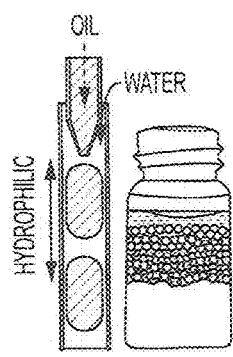
FIG. 4A is an image showing collection of an oil-in-water emulsion consistent with the prior art, showing retention of the emulsion structure.

The control of adhesion during droplet motion can be used to realize a separation process, targeted release, and other applications in lab-on-a-chip systems. In this example, droplet adhesion is used to recycle the ingredient materials of emulsions in microfluidics. For example, emulsion droplets are used in many lab-on-a-chip applications, such as encapsulation, delivery, and separation. In some applications, the materials of the emulsions are valuable and so recycling is needed. However, typically the emulsions are stable and not easily broken down to two separated phases. As a specific example, for a typical oil-in-water emulsion system, where silicone oil (Dow Corning 200® Fluid, 20 centistokes) is the droplet phase and an aqueous solution of 5 wt. % PVA is the continuous water phase, where PVA is playing the role of a surfactant, the collected emulsion droplets still remain a stable emulsion and the oil droplets are mixed with the water phase even after collection in a collection vessels, as shown in FIG. 4A. Consistent with the prior art, with such collection of the emulsion, the drops maintain their spherical shape, and did not break.

Figure 4B:
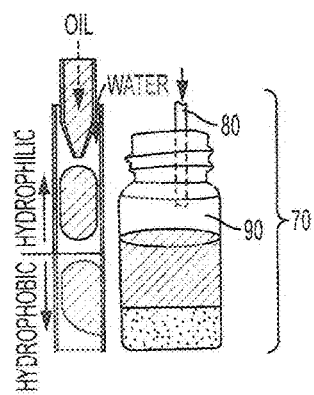
FIG. 4B is an image showing collection of the broken oil-in-water emulsion, showing separation of the oil and water phases after collection, consistent with the present invention.

However, when the emulsion-breaking device illustrated above is employed, then below a critical speed the oil emulsion droplets passing in the solvophilic region will break up in the solvophobic region (or vice versa). Thus, the oil phase from the broken emulsion naturally separates from the water phase in a collection vessel, as shown in FIG. 4B. Accordingly, the pure oil phase can be easily collected from the broken emulsion fluid as shown in FIG. 4B. In this case the phase separation system 70 includes simply a body 80 having a microchannel, such as a glass capillary, transporting the fluid flow to an open collection vessel 90, in which the immiscible fluids are permitted to settle naturally, as shown in FIG. 4B.

In exemplary experiments, the body was a square capillary, the inner dimension of the square capillary was 1.05 mm, the diameter of the oil droplets in the oil-in-water emulsion were 1.8 mm, and the translation speed of the droplets was 2 mm/s. The emulsion remained stable when flowing through a hydrophilic square capillary into the collection container. However, when the droplets flowed through the device with a treated capillary, the oil droplets broke up in the hydrophobic region of the treated capillary, and the oil phase subsequently separated from the aqueous phase in the collection container.

Figure 5B:
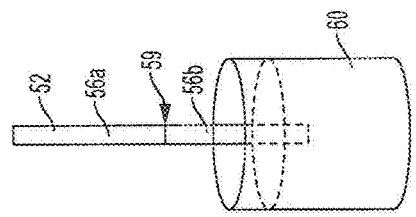
FIG. 5B is a diagrammatic view illustrating a process for making the emulsion-breaking device of FIG. 5A.
Figure 5A:
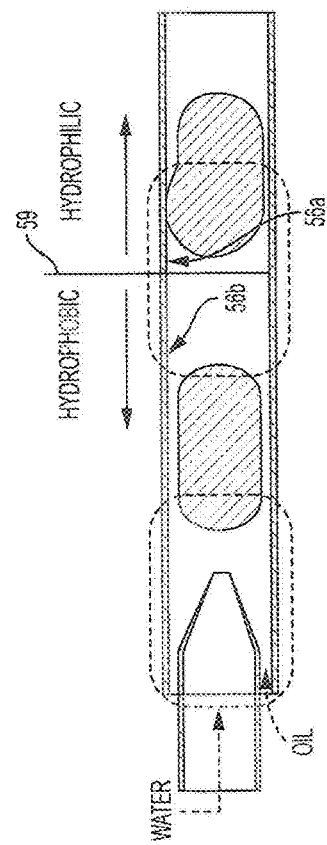
FIG. 5A is a diagrammatic view of an emulsion-breaking device in accordance with an exemplary embodiment of the present invention, and adapted for a water-in-oil emulsion.
Figure 6A:
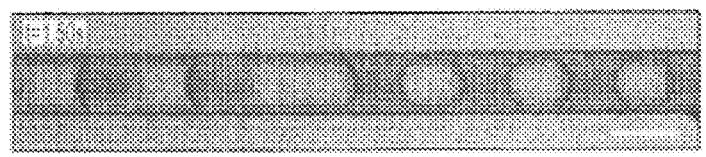
FIG. 6A-D are a series of time-sequenced photographic images showing an exemplary adhesion process for an exemplary water-in-oil emulsion within the emulsion-breaking device of FIG. 5A.
Figure 6B:
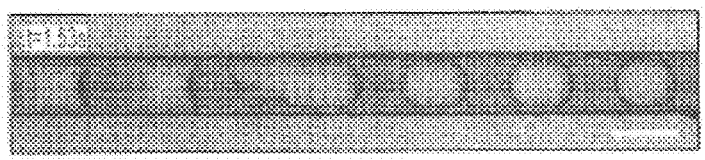
Figure 6C:
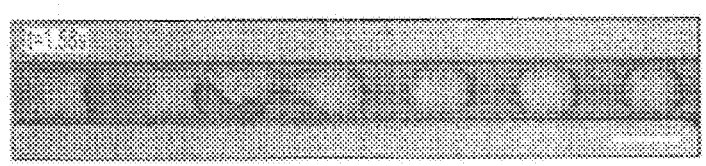
Figure 6D:
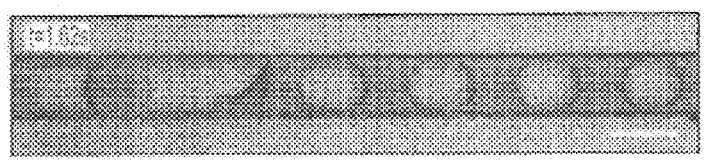

In another embodiment, a water-in-oil emulsion may be broken. FIG. 5A is a diagrammatic view of an emulsion-breaking device 50 in accordance with an exemplary embodiment of the present invention, and adapted for a water-in-oil emulsion. In such an embodiment, the oil phase is the continuous phase, and the water phase is the dispersed phase. In this embodiment, the system is essentially the same as that shown in FIG. 1A, except that the emulsion-breaking device 50, which may be formed in a manner similar to that described above, is disposed within the microfluidic system 100 such that the upstream zone is provided with a hydrophobic surface, and the downstream zone is provided with a hydrophilic surface, as will be appreciated from FIG. 5A.

Accordingly, water droplets were generated and transported from an upstream zone having a hydrophobic inner microchannel surface 56b to a downstream zone having a hydrophilic inner microchannel surface 56a. The microfluidic device consisted of a co-flowing structure for the generation of the droplets and a straight square capillary with modified wettability, as shown in FIG. 5A. In this example, a cylindrical glass capillary with an outer diameter of 1 mm was tapered by a pipette puller, and the tapered glass capillary was inserted into a square glass capillary with an inner size of 1.05 mm to form the co-flow structure, where water-in-oil droplets were generated. The continuous phase, such as liquid paraffin (Sinopharm Chemical Reagent Beijing Co.), may be injected into the interstices between the two capillaries, while the aqueous phase, which may be an aqueous solution of 2 wt. % polyvinyl alcohol (PVA, Mw=13000-23000 g/mol, 87-89% hydrolyzed, Sigma-Aldrich), may be injected into the inner capillary. Both the injection of the aqueous phase and the oil phase are controlled by syringe pumps, and the size of the water droplets may be changed by adjusting the flow rate ratio of the two phases. In one example, the surface tension between the two phases was $\gamma=16.6$ mN/m, the viscosity of the aqueous phase was $\mu=1.9$ mPa-s, and the viscosity of the oil phase was 28.9 mPa-s. Accordingly, the microfluidic device and steps in this embodiment are generally the same as those in the oil-in-water approach described above, except that the fluid phases are interchanged and flowing direction through the emulsion breaking device is reversed.

FIGS. 6A-D are a series of time-sequenced photographic images showing an exemplary adhesion process for an exemplary water-in-oil emulsion within the emulsion-breaking device of FIG. 5A. As will be noted from FIGS. 6A-D, adhesion of the water droplets on the hydrophilic surface occurs as the water-in-oil emulsion droplets flow past the hydrophilic part of the microchannel. More specifically, the water droplets adhere on the hydrophilic surface, wetting the hydrophilic microchannel surface, and hence the water-in-oil emulsion is broken. The broken emulsion fluid may be subsequently be collected in a phase separator, where the oil and water phases will separate in a collection vessel in a manner similar to that described above. In one experiment, it was observed that the above-described emulsion broke up as shown in FIGS. 6A-D when the flow rate of the continuous phase was about 8 to about 22 μL/min, and that higher flow rates did not result in breaking of the emulsion.

Figures 7A, 7B:
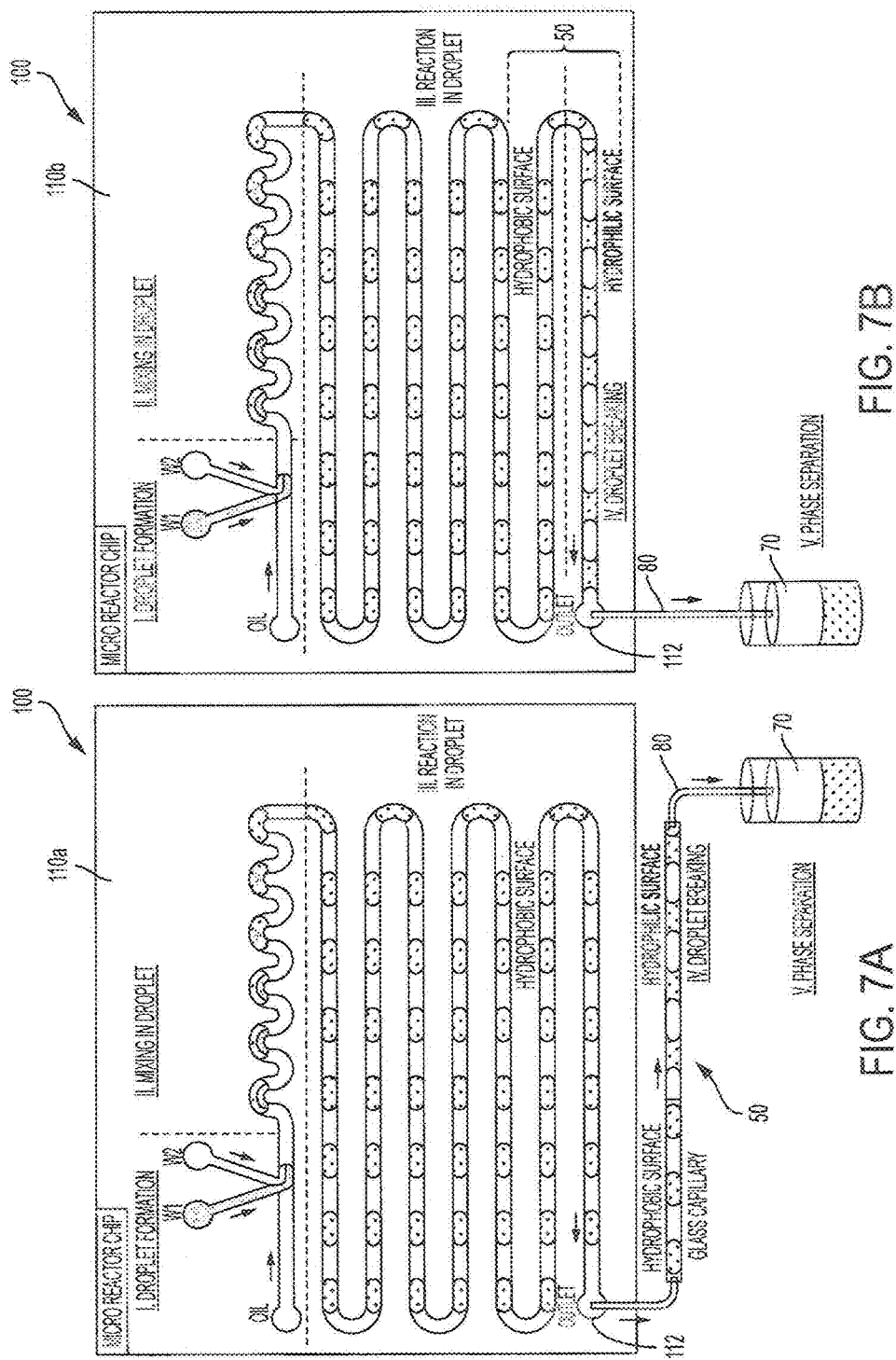
FIG. 7A is a diagrammatic view of a microfluidic system including a micro-reactor chip and an exemplary discrete emulsion-breaking device positioned downstream from the micro-reactor chip.
FIG. 7B is a diagrammatic view of a microfluidic system including a micro-reactor chip having an exemplary emulsion-breaking device integrated into the micro-reactor chip.

As discussed above, an emulsion-breaking device in accordance with the present invention may be included within a microfluidic system. FIGS. 7A and 7B are diagrammatic views of microfluidic systems 100 including micro-reactor chips 110a, 110b. As will be appreciated by those skilled in the art, the micro-reactor chip may have any suitable configuration. By way of example, each exemplary micro-reactor chip 110a, 110b has three main stages, namely: (I) droplet formation, (II) mixing in droplet, (III) reaction in droplet. In this example, two reagents, W1 and W2 (aqueous reagents in this non-limiting example), are pinched off to individual droplets by the continuous phase (oil in this non-limiting example) in stage (I). The reagents W1 and W2 in the droplets are well mixed in the curved channel of stage (II). Then, the droplets act as a micro reactor, and the reaction in the droplets can be observed and studied in the Reaction in Droplet stage (III). By way of example, the chip can be made either on PDMS or glass. An emulsion-breaking device in accordance with the present invention is then provided downstream of the microfluidic chip (particularly the reaction stage (III)).

In the exemplary embodiment of FIG. 7A, the microfluidic system 100 includes a micro-reactor chip 110a and an exemplary discrete emulsion-breaking device 50 positioned downstream from the micro-reactor chip. Accordingly, a discrete emulsion breaking body may be used, such as a glass capillary, as discussed above. Accordingly, as shown in FIG. 7A, an outlet 112 of the chip is connected to, and in fluid communication with, a separate emulsion-breaking device. In this example, the device is configured for treating water-in-oil emulsions, and thus the emulsion-breaking device 50 includes an upstream zone having a hydrophobic inner surface, and a downstream zone having a hydrophilic inner surface. Accordingly, the emulsion will break in the hydrophilic section of the device.

By way of further example, FIG. 7B is a diagrammatic view of a microfluidic system 100 including a micro-reactor chip 110b having an exemplary emulsion-breaking device integrated into the micro-reactor chip. Accordingly, in this embodiment, the emulsion-breaking device 50 is not a discrete element of the system, but rather is a portion of the chip itself, as shown in FIG. 7B. Again, for a water-in-oil emulsion, the emulsion-breaking device includes an upstream zone having a hydrophobic inner surface, and a downstream zone having a hydrophilic inner surface. Accordingly, the emulsion will break in the hydrophilic section of the device.

In both cases, the emulsion-breaking device includes a zone in which the inner surface is not wettable by the dispersed phase, followed by a downstream zone in which the inner surface is wettable by the dispersed phase. Further, it will be appreciated that the emulsion-breaking device need not be a discrete component of a microfluidic system, and that the upstream portion of the emulsion-breaking device may be all or a portion of a conventional microfluidic system, such that adding the emulsion-breaking device to a conventional microfluidic system may in some circumstances involve the addition of only a flow channel having an inner surface that is wettable by the dispersed phase (and, as will be appreciated by those skilled in the art, that same inner surface is not wettable by the continuous phase). Accordingly, in some embodiments, a microfluidic system having microchannels having an inner surface wettable by the continuous phase of an emulsion, and the emulsion-breaking device may include only one zone, namely, a zone having an inner surface wettable by the dispersed phase of the emulsion, and not wettable by the continuous phase of the emulsion. In this case, the portion of the microfluidic system upstream of the emulsion-breaking device is effectively the upstream first zone described above, and one zone is effectively the downstream second zone described above.

Accordingly, the disclosed process and devices can be used as a phase separator for oil-in-water and water-in-oil emulsions, and may be used in the recapture and recycling of the ingredient materials of emulsions. It provides a simple and reliable design of devices, the function of which is controlled by the translation speed of the droplets in the device, instead of the trigger by an external electric-field or complicated geometries.

The device may be simply made of a glass capillary, which is commercially available with various dimensions. In such embodiments, neither complicated geometries, nor further fabrication process to modify the geometry of the capillary is needed.

An emulsion-breaking device may be made simply by immersing a body having a microchannel vertically into an octadecyltrichlorosilane (OTS) solution, which is a common chemical commercially available, to make a hydrophobic surface. In such embodiments, no further fabrication processes, such as accurate alignment, photolithography, developing and etching, are needed to modify the surface properties of the body.

The breaking of the emulsion may be induced by flowing the emulsion droplets below a critical speed. For droplets with a certain size, a flow may be provided at a relatively high flow speed, and the flow may be simply slowed until adhesion occurs, to help identify the critical speed.

Further, the emulsion-breaking device is capable of breaking not only water-in-oil emulsions, but also stable oil-in-water emulsions.

Further, no external electric field is required for emulsion breaking and phase separation.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claims is:

1. A method of breaking an emulsion comprising:
   flowing an emulsion of droplets of a dispersed phase entrained in a continuous phase below a critical speed into one end of an emulsion breaking device comprising a body defining an elongated internal channel having an inner surface extending from a single channel inlet to a single channel outlet, a first zone of said channel having an inner surface that is solvophilic to the continuous phase, a second zone of said channel having an inner surface that is solvophobic to the continuous phase, the solvophilic and solvophobic inner surfaces meeting at a boundary intermediate a length of the channel; and
   collecting liquid flowing from the emulsion breaking device.

2. The method of claim 1, wherein the collected liquid is collected in a vessel, the method further comprising:
   withdrawing from the vessel one of the dispersed phase and the continuous phase separately from the other of the dispersed phase and the continuous phase.

3. The method of claim 1, wherein said flowing the emulsion comprises flowing an oil-in-water emulsion, and wherein the emulsion is flowed into an end of said emulsion breaking device having a hydrophilic inner surface.

4. The method of claim 1, wherein said flowing the emulsion comprises flowing a water-in-oil emulsion, and wherein the emulsion is flowed into an end of said emulsion breaking device having a hydrophobic inner surface.

5. The method of claim 1, wherein the critical speed comprises a speed above which the dispersed phase does not adhere to the inner surface of the second zone of the channel, and below which the dispersed phase does adhere to the inner surface of the second zone of the channel.

6. The method of claim 1, wherein said flowing the emulsion below a critical speed comprises:
   flowing the emulsion at an initial flow speed at which the dispersed phase does not adhere to the inner surface of the second zone of the channel; and
   reducing a speed of flow of the flowing emulsion until the dispersed phase adheres to the inner surface of the second zone of the channel.

* * * * *